J. L. HORNIG.
Manufacture of Car-Wheels.

No. 147,938. Patented Feb. 24, 1874.

Witnesses.
John Becher
Geo. Haynes

J. L. Hornig
by his Attorneys
Brown & Allen

UNITED STATES PATENT OFFICE.

JULIUS L. HORNIG, OF JERSEY CITY, NEW JERSEY.

IMPROVEMENT IN THE MANUFACTURE OF CAR-WHEELS.

Specification forming part of Letters Patent No. 147,938, dated February 24, 1874; application filed February 7, 1874.

*To all whom it may concern:*

Be it known that I, JULIUS L. HORNIG, of Jersey City, in the county of Hudson and State of New Jersey, have invented an Improvement in the Process of Forging Car-Wheels, of which the following is a specification:

This invention relates to the manufacture of car-wheels in which the hub, rim, and web are composed of wrought-iron or steel, or both combined, and said parts united by welding or forging. The invention consists in a novel process of welding these parts together by means of dies constructed so that the welding pressure is relieved from the web and concentrated on the rim and hub, and the parts upset at their welding points by forcing the surplus metal from the hub and rim toward and into the web, whereby a more solid and cleaner or sharper finished wheel, requiring but little after-dressing, is obtained.

In carrying out my improved process, I first separately form the hub, the rim, and a connecting-web, each of wrought-iron or steel, or both combined, and compress and solidify the hub and rim while heated. A welding heat is subsequently applied to the portions of the hub and rim with which the web is required to unite, also to the welding surfaces of the latter, and all three seated to their places in a mold, or within and between dies, and in proper relation with each other, when hydraulic or other pressure is applied to weld, mold, and firmly unite the several parts, as hereinafter described.

Figure 1:
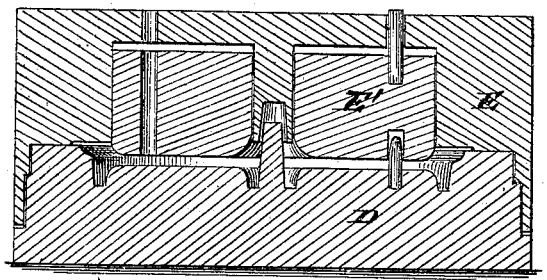
Figure 2:
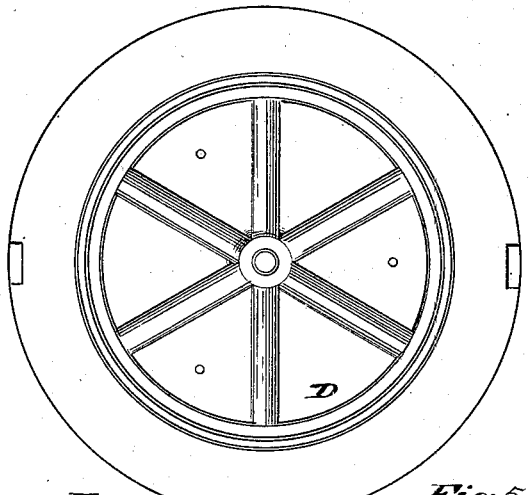
Figure 3:
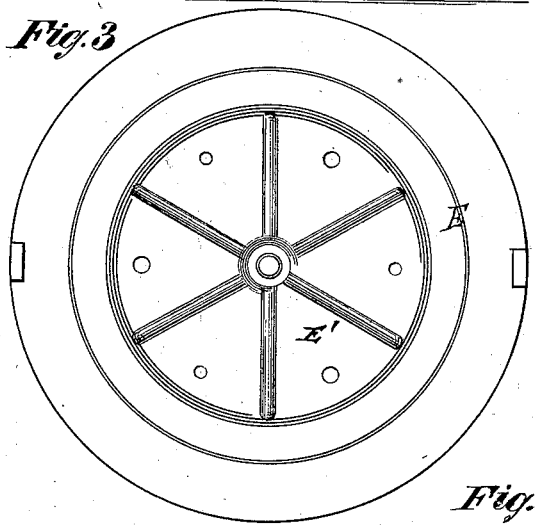
Figure 4:
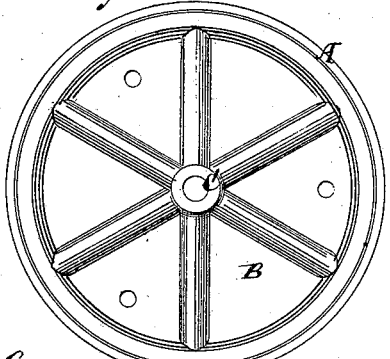
Figure 5:
Figure 6:
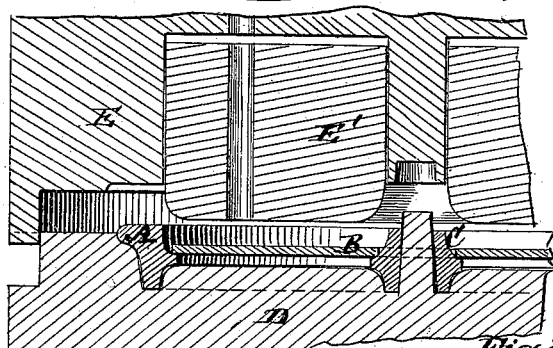
Figure 7:
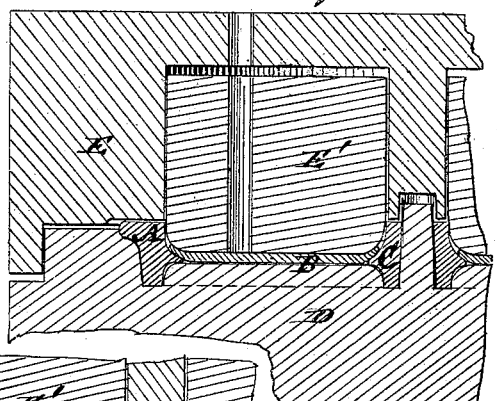

In the accompanying drawing, Figure 1 represents a vertical section of a pair of dies suitable for making a car-wheel in accordance with my invention, said dies being shown as brought together, but without the metal of the wheel in between them; Fig. 2, an interior face view of the lower one of said dies; and Fig. 3, a similar view of the upper one of such dies. Fig. 4 is a side or face view of a car-wheel as made in said dies, and Fig. 5 a sectional view of the same in line with the axis. Fig. 6 is a vertical section of the dies, in part, with the hub, rim, and web of the wheel in position to be welded together, but prior to any action of the dies thereon; Fig. 7, a similar view, showing a preliminary action of the dies for the purpose of joining or bringing together the web with the hub and rim; and Fig. 8, a like view, showing the dies as finally closed to effect the weld.

Figure 8:
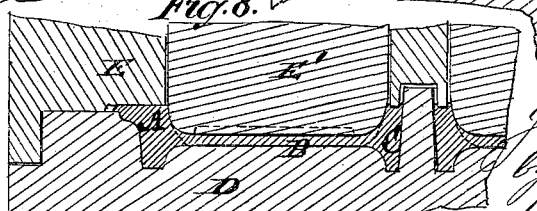

The wheel shown in the accompanying drawing as made by my improved process consists of a rim, A, made from a circular iron-scrap pile, with the fibers running principally in a circumferential direction and compressed solid under a welding heat, and which is afterward reheated and expanded by forcing it over the outside of a cone; or said rim may be made of malleable cast-steel. The web B of the wheel, which is here shown of a corrugated construction, but may be plain or in the shape of spokes, may be made from a wrought-iron rolled plate cut into a circular shape, and provided with a hole in the center to receive the hub; or said web may be a weldable steel sheet properly shaped. The hub C may be made of wrought-iron piled into ring shape and compressed in a suitable mold, under welding heat, till solid. The web, rim, and hub being thus or otherwise suitably made, the web is heated principally at its inner and outer ends or circumferences, and the hub and rim all separately but simultaneously brought to a welding heat. The rim A and hub C are then placed respectively in a lower mold or die, D, the hub fitting over a center pin or stud, and the web introduced between the hub and the rim. An upper die or mold, E E', is then brought down, by hydraulic pressure or otherwise, at first with a gentle or separate pressure of the central portion E' of the die, which portion may have an independent action, so that the same first comes in contact with the welding parts of the rim, hub, and web, and places said parts, as it were, as represented in Fig. 7, thus doing what the blacksmith does by his first blow in ordinary forging. A further down movement of the upper die, as represented in Fig. 8, brings its outer and inner portions E E' on the rim, hub, and web of the wheel, to upset said parts at their welding points toward the web, which is free to give either by the yielding of the inner portion of the upper die or by a hollowed construction of its under surface, thus forcing the surplus metal from the rim and hub into the web, only leaving a slight fin, if any, outside of the rim and hub, thereby necessitating but little after-dressing, and forming a more solid and sharper finished wheel, with the surplus metal, in completing the weld, driven inward in opposite directions, instead of outward.

I claim—

The process of forging car-wheels by means of dies constructed to compress the rim and hub and upset or force the surplus metal toward or into the web from both the rim and hub, each of said parts of the wheel being made separate and brought to a welding heat at their contiguous surfaces for the purpose, substantially as described.

JULIUS L. HORNIG.

Witnesses:
MICHAEL RYAN,
VERNON H. HARRIS.